(12) United States Patent
Curtis et al.

(10) Patent No.: US 6,330,003 B1
(45) Date of Patent: Dec. 11, 2001

(54) TRANSFORMABLE GRAPHICAL REGIONS

(75) Inventors: Donald B. Curtis, Bellevue; Ikko Fushiki, Redmond; J. Andrew Goossen, Issaquah; Hock San Lee, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/364,460

(22) Filed: Jul. 30, 1999

(51) Int. Cl.$^7$ ........................................ G06T 3/00
(52) U.S. Cl. ............................................... 345/648
(58) Field of Search ................... 345/433, 436, 345/437, 438, 439, 441, 619, 648, 649, 672

(56) References Cited

U.S. PATENT DOCUMENTS

| | | | |
|---|---|---|---|
| 5,701,467 | * 12/1997 | Freeston | 395/611 |
| 5,745,121 | 4/1998 | Politis | 345/433 |
| 5,926,183 | * 7/1999 | Menon et al. | 345/442 |
| 6,191,797 | * 2/2001 | Politis | 345/440 |

FOREIGN PATENT DOCUMENTS

WO 94/22101    9/1994 (WO).

OTHER PUBLICATIONS van Kleij, R., "Efficient Display of Quadric CSG Models," *Computers in Industry*, May 19, 1992, No. 2, pp. 201–211.
Rappoport, A., et al. "Interactive Boolean Operations for Conceptual Design of 3–D Solids," Computer Graphics Proceedings, Siggraph, Annual Conference Series, 1997, pp. 269–278.

* cited by examiner

*Primary Examiner*—Almis R. Jankus
*Assistant Examiner*—G. F. Cunningham
(74) *Attorney, Agent, or Firm*—Woodcock Washburn LLP

(57) ABSTRACT

A system and method of providing a transformable region that may be used on graphics devices having different resolutions. The original path and geometric data of the region, as well as all operations performed on the data, are preserved when generating the region. The device-independent region can be described by a hierarchical tree, wherein the leaf nodes contain path or rectangle, ellipse, pie, and polygon data and the branch nodes contain the operations to be performed on the regions. As the tree is traversed and regions are used, they are converted to a device resolution-specific from such that the operations are performed on device resolution-specific regions. Matrix transformation operations (e.g., translate, scale, skew and rotate) can be applied because the original path information is preserved and if the region is to be used in a device having a different resolution or a subsequent matrix operation is to be applied to the region, the tree can be re-traversed.

19 Claims, 10 Drawing Sheets

TRANSFORMABLE GRAPHICAL REGIONS

FIELD OF THE INVENTION

The present invention relates to image storage and processing in computers, and, more particularly, to storing and processing of graphical regions by preserving the original path data, and combination or transformation operations that define the region, and converting regions to a device-specific coordinate space on an as-needed basis.

BACKGROUND OF THE INVENTION

Most modern computer graphics systems today use raster graphics to display images. A raster graphics system displays an image as a raster grid, where each line of the grid is composed of a row of pixels. The image may be stored as a two-dimensional array of values, where each row of the array corresponds to a grid line of pixels, and each value of the array represents the data associated with a particular pixel. The image can then be processed via the array, and converted back into scan lines for display on the raster grid.

Operating systems have specially designed graphics subsystems that have been developed to address the problems inherent in creating, manipulating (e.g., define, clip, fill, draw and combine), and storing images in computer memory. For example, in the Microsoft® Windows® operating systems, the subsystem that controls the display of text and graphics is called the Graphics Device Interface (GDI). GDI functionality is provided through an application programming interface (API) that includes functions to create graphical objects and manipulate those objects in memory. GDI draws lines, curves, closed figures, text, and bitmapped images on display devices and printers. There are a number of methods that have been developed in GDI for manipulating complex images.

One method of storing image data is to define the image data as a "region." The concept of a region was developed for the graphics subsystem in the Microsoft Windows® operating system to more easily store and process arbitrary two-dimensional shapes. Regions accommodate shapes that can be displayed as simple opaque images. The image data structure of the region is based on an image of an arbitrary two-dimensional shape expressed as a grid of binary values, e.g., 0 and 1, where the value 0 represents a transparent pixel (absence of the shape), and the value 1 represents an opaque pixel (presence of the shape).

A limitation of GDI regions, however, is that once a region is created for a specific device context (HDC), its dimensions are fixed by the resolution of the specific device (e.g., a monitor or printer) associated with that HDC. In particular, the conversion entails converting the shape of the region to device coordinates specific to the particular device. Further, the original path information that defined the shape of the region is not retained and is replaced with the device resolution-specific scan rectangles. Thus, if two device contexts were associated with different devices having different resolutions, then using the same region for both device contexts would produce unwanted results.

Another limitation of regions is that once they have been created, transforming them with matrix operations such as translate, scale, rotate, and skew can accentuate the "jaggies". The primary reason for this effect is that it is not the original shape that is transformed, but it is the sequence of rectangle spans produced from the shape. A solution to this problem is using constructive geometry to create transformable regions. Such a solution is proposed in Java 2D. However, this solution is too complex and costly to implement, and without significant graphical resources, results in slow rendering of graphics regions. Thus, this solution is feasible only for extremely fast and expensive graphical subsystems.

Related to the above is the inability of regions to store and process images having non-binary values associated with the pixels of the image. As noted above, a region can only store the fully opaque and fully transparent areas and, therefore, does not store anti-aliasing information. The use of anti-aliasing techniques improves the appearance of the image by altering the opacity of pixels at the image's boundaries. Thus, when matrix operations are performed on a region within a particular graphics context (i.e., a specific device), the resulting region often includes significant aliasing resulting in the appearance of "jaggies" or "staircasing" at the edges of the primitives of the image region. These undesirable characteristics are common because most shapes can only be approximated with pixels on the raster grid.

In view of the above, there is a need for an improved graphics engine in a computing device that overcomes the limitations of the prior art. In particular, there is a need for a graphics engine capable of manipulating regions such that the regions may be associated with multiple devices having different resolutions. Further, there is a need for a graphics engine that provides for transformable regions using matrix operations. Still further, there is a need for a graphics engine that provides regions that may be rendered anti-aliased on devices having different resolutions. The present invention provides a solution to these problems.

SUMMARY OF THE INVENTION

The present invention utilizes transformable regions that are converted into device resolution-specific form only when needed. The original path data of the region, as well as all logical and matrix transformation operations performed to combine regions is preserved. Because the original path information is preserved, transformation operations may be applied to the path data such that the region can be regenerated for different devices.

In accordance with the present invention, a region can be represented by a hierarchical tree, wherein the leaf nodes contain path or geometric data (e.g., rectangles, ellipses, pies, and polygons) and the branch nodes contain the operations to be performed on the path, geometric data and regions. As the tree is traversed and regions are used, they are converted to a device resolution-specific regions and operations are performed on the device resolution-specific regions, rather then using complex constructive geometry to combine regions. In addition, the present invention allows for matrix transformation operations (e.g., translate, scale, skew and rotate) to be applied to the regions, because the original path information is preserved. Thus in accordance with the present invention, if a transformation matrix is applied to the region or if the region is used in a device having a different resolution, the tree can be re-traversed. Accordingly, regions may be freely transformable objects after they have been combined with other regions.

Other features of the invention are described below.

BRIEF DESCRIPTION OF THE DRAWINGS

The foregoing summary, as well as the following detailed description, is better understood when read in conjunction with the appended drawings. For the purpose of illustrating the invention, like references numerals represent similar parts throughout the several views of the drawings, it being understood, however, that the invention is not limited to the specific methods and instrumentalities disclosed. In the drawings:

FIG. 14 is a flow chart illustrating an overview of traversing a hierarchical tree;

DETAILED DESCRIPTION OF THE INVENTION

The present invention provides for transformable regions that are converted into device specific coordinates on an as-needed basis such that regions may be freely transformable objects amongst devices having different resolutions. A transformable region is defined as a resultant region formed from an operation performed on a first and second region each having a transform (i.e., Resultant Region=(Region 1 with a transform) op (Region 2 with a transform), wherein where op is one of OR, AND, XOR, SUBTRACT, and SUBTRACT_FROM). For example, in case of a simple region, Region 2 is NULL and Region 1 is made of a path or a primitive shape such as a rectangle.

Initially, an exemplary computing environment will be described within which the present invention may be embodied. Component details and exemplary implementations will follow.

I. Computer Environment

Figure 1:
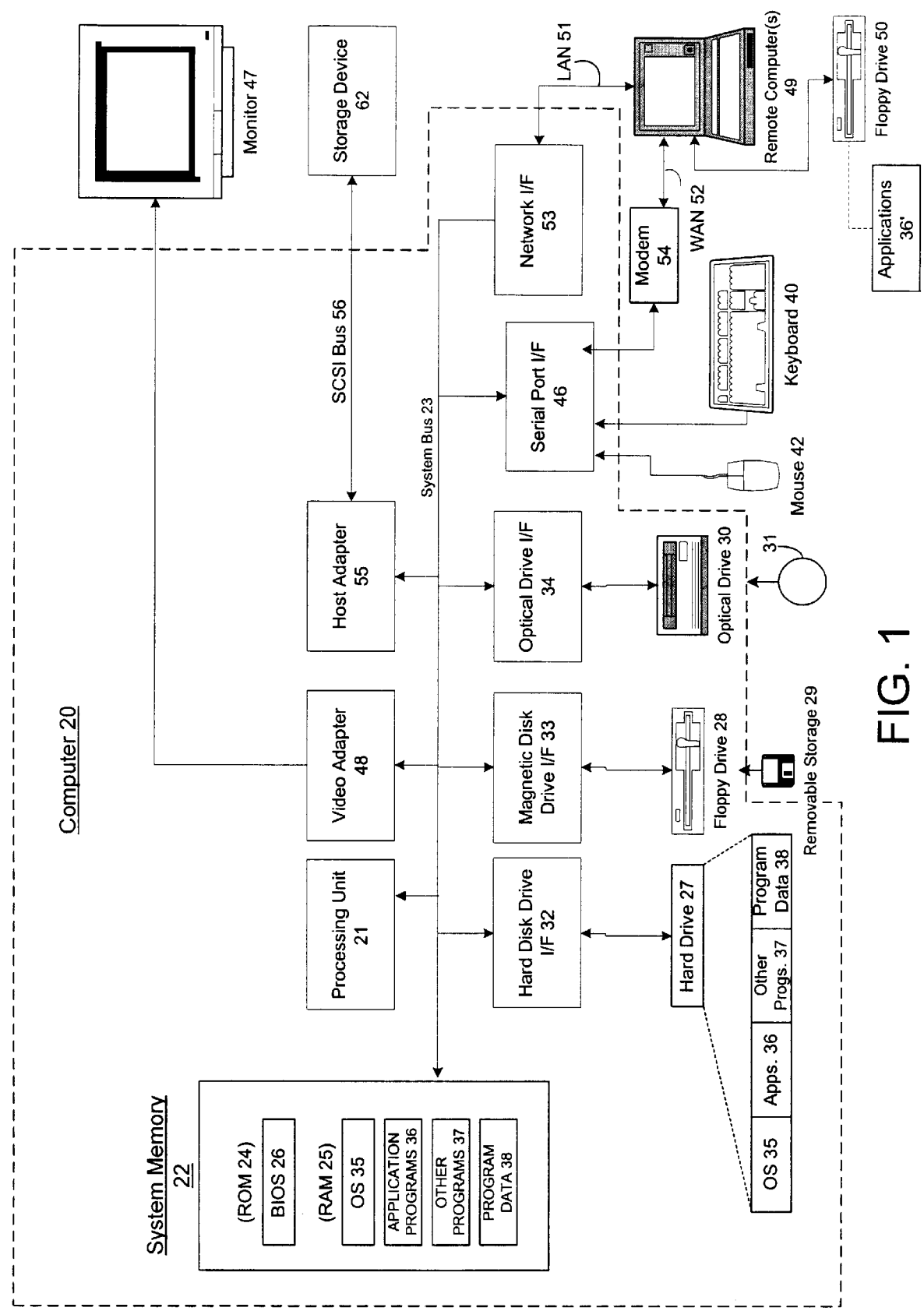
FIG. 1 is a block diagram of an exemplary environment in which the present invention may be implemented.
Figure 2:
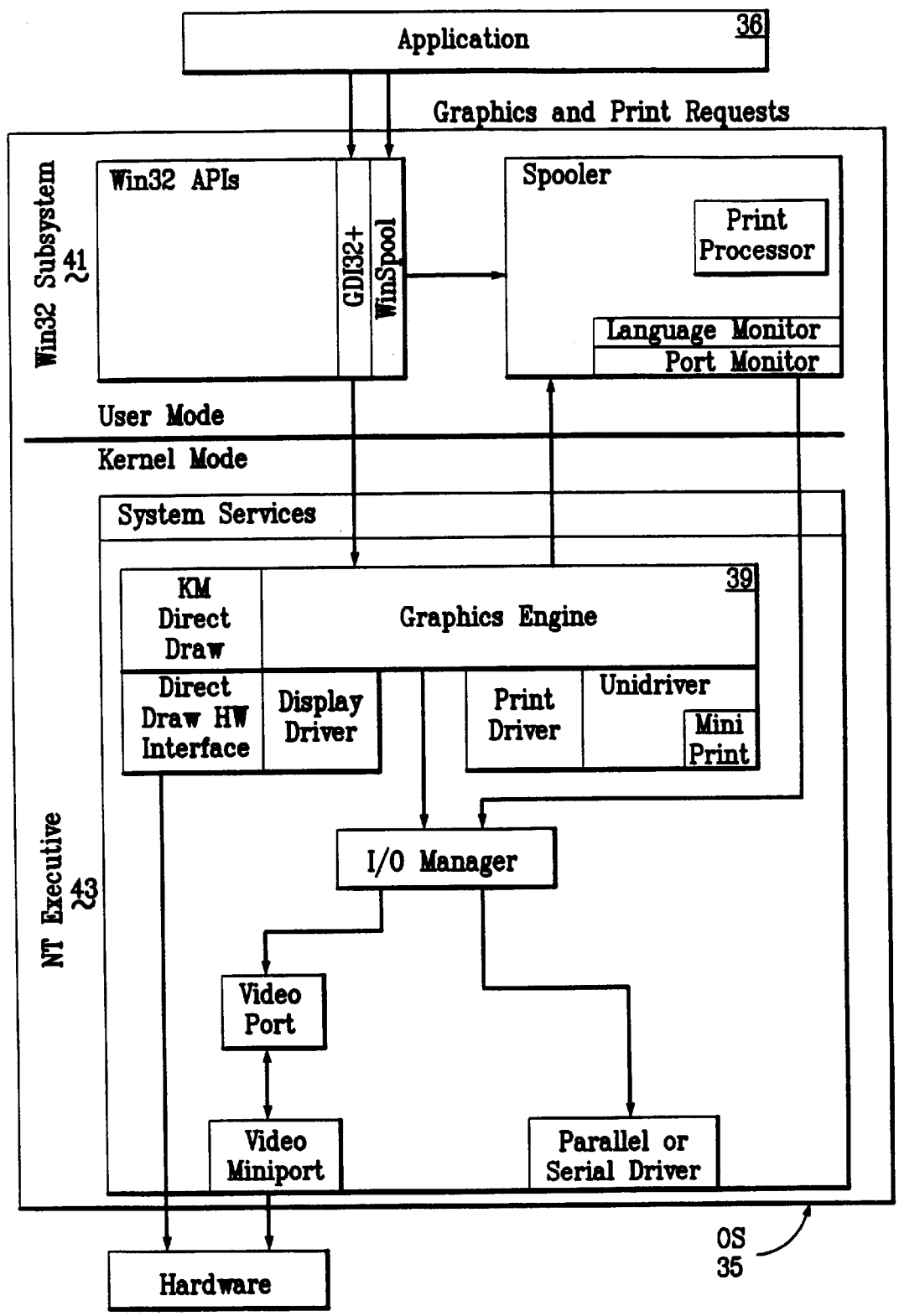
FIG. 2 is a block diagram of an exemplary operating system providing a graphics system architecture from application to driver output.

FIGS. 1 and 2, and the descriptions thereof, are provided as a brief general description of a suitable computing environment in which the invention may be implemented. Although not required, the invention will be described in the general context of computer-executable instructions, such as program modules, being executed by a computer, such as a client workstation or a server. A more detailed description of the invention will be presented with reference to FIGS. 3–16.

Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port, universal serial bus (USB), or a 1394 high-speed serial port. A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

FIG. 2 illustrates a block diagram of an exemplary operating system 35 providing a graphics system architecture from the application 36 to driver output. In the present example, the operating system comprises the Windows NT® operating system, which provides graphics support as a part of its executive services.

Microsoft® Win32® applications request graphics and print operations by calling the system-supplied Win32 GDI+ and WinSpool functions (e.g., APIS). The Win32® APIs allow application developers to implement device-independent code. The Win32® subsystem 41 routes graphics requests to a graphics engine 39 by way of the NT executive system services 43. The graphics engine 39, also referred to herein as GDI+, processes these requests in conjunction with the hardware-specific monitor 47 or printer driver. A display driver is paired with a video miniport driver to complete video display support. Each video miniport driver provides hardware-level support for its associated display driver. The Windows NT® spooler enables print jobs to be routed to local and network printers.

II. Component Details of Graphics System (GDI+) of the Present Invention

The following describes an improved system and method for storing and processing arbitrary two-dimensional shapes in an advanced graphics system.

A. Coordinate Spaces

Figure 3:
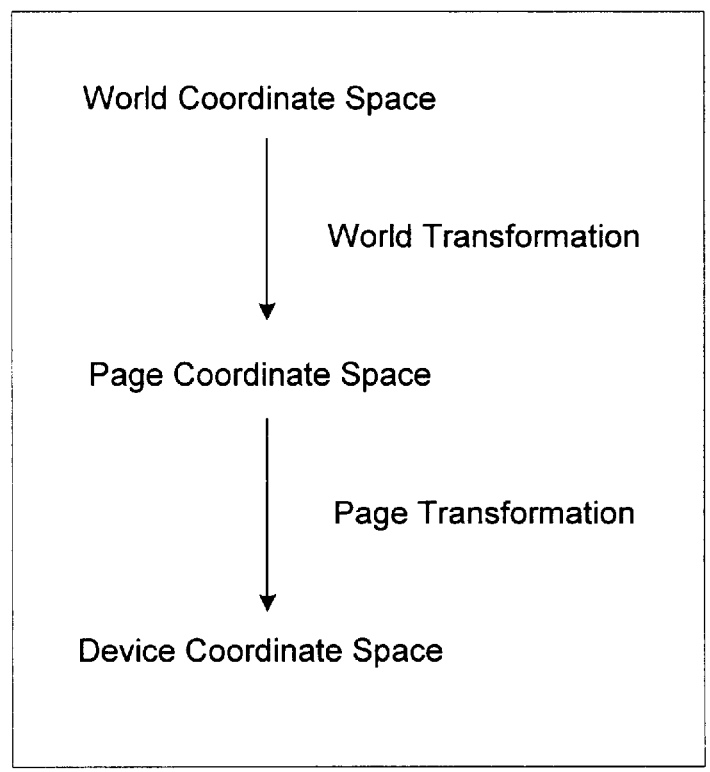
FIG. 3 illustrates graphics coordinate spaces utilized in the graphics system of FIG. 2.
Figure 4:
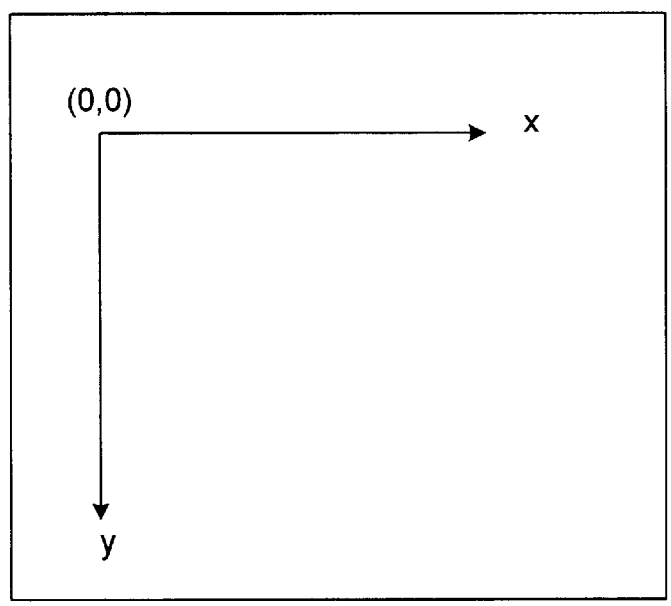
FIG. 4 illustrates an exemplary coordinate system with the graphics system of FIG. 2.

Referring to FIG. 3, the graphics model supports three graphics coordinate spaces: world, page, and device coordinate spaces. Graphics coordinates are preferably provided by the application 36 to GDI+39 in world coordinates. A exemplary default coordinate system is shown in FIG. 4, wherein positive x is to the right, positive y is down, and the origin is at the top-left corner of the drawing surface. In addition to the world and page transforms, the system may apply an additional transform, called a system transform (not shown), to convert device coordinates to screen coordinates on the drawing surface. The system transform is used by the system to map graphics drawing to the drawing surface, typically in a window. Applications cannot modify the system transform.

Geometrical transforms convert graphics coordinates between coordinate spaces, and are part of the graphics states. As shown in FIG. 3, the world transform converts graphic coordinates from the world space to the page space. The page transform converts graphics coordinates from the page space to the device space. The page transform does not define any clipping in the graphics context. The application 36 can initialize, modify, and retrieve the page transform in the graphics context.

The page transform is described by a page unit, a scale, an origin, and an orientation. The page unit defines the units in page space, as shown in Table 1. All units are device independent except PIXEL, whose physical size varies from device to device. The default page unit is DISPLAY.

TABLE 1

| Page Unit | Measurement |
| --- | --- |
| MILLIMETER | Each unit represents 1 millimeter. |
| INCH | Each unit represents 1 inch. |
| PT | Each unit represents a printer's point, or $1/72$ inch. |
| DISPLAY | Each unit represents $1/75$ inch. This is the default. |
| DOCUMENT | Each unit represents $1/300$ inch. |
| PIXEL | Each unit represents one device pixel. The size varies from device to device. |

The page scale modifies the scale of page units along x- and y-axes in the page space. The default page scale is 1. The page origin specifies the location of the origin in the page space, and is specified in the given scaled page units relative to the top-left corner of the drawing surface, as shown in FIG. 4. The page orientation defines the direction of x- and y-axes in page space and has a geometrical effect on graphics coordinates, with the exception of text. The x-axis directions are LEFT_TO_RIGHT and RIGHT_TO_LEFT. The y-axis directions are TOP_TO_BOTTOM and BOTTOM_TO_TOP. Thus, The default page orientation shown in FIG. 4 is LEFT_TO_RIGHT and TOP_TO_BOTTOM.

B. Transforms

There are two techniques to specify a geometric transform, the first is to apply a transform matrix, and the second is to use a mapping transform. A transform matrix is preferably a 2D affine matrix represented by the following matrix:

$$\begin{bmatrix} m11 & m12 & 0 \\ m21 & m22 & 0 \\ dx & dy & 1 \end{bmatrix}$$

If W and P represent the world and page transform matrices, the relationship between the world coordinates (x, y) and the device coordinates (x', y') may be determined by the following relationship:

$$[x' y' 1] = [x y 1] \cdot W \cdot P$$

Various transformation matrices may be defined using the above relationship. A translation matrix with an offset vector (dx, dy) is given by:

$$\begin{bmatrix} 1 & 0 & 0 \\ 0 & 1 & 0 \\ dx & dy & 1 \end{bmatrix}$$

A scale matrix with a scale vector (sx, sy) is given by:

$$\begin{bmatrix} sx & 0 & 0 \\ 0 & sy & 0 \\ 0 & 0 & 1 \end{bmatrix}$$

A rotation matrix with an angle of θ degrees clockwise about the origin is given by:

$$\begin{bmatrix} \cos\theta & \sin\theta & 0 \\ -\sin\theta & \cos\theta & 0 \end{bmatrix}$$

[001]
Other transformation matrices may be used.

The mapping transform is a 2D affine matrix that maps a rectangle to a parallelogram. It is specified with a source rectangle and a destination parallelogram. The source rectangle is defined by its width (w), height (h), and (x, y) coordinates. The coordinates (x, y), (x+w, y), (x, y+h) and (x+w, y+h) specify the top-left, top-right, bottom-left, and bottom-right corners respectively. The destination parallelogram is given by an array of three points identifying three of its corners. The mapping transform maps the top-left corner of the rectangle to the first point, the top-right corner to the second point, and the bottom-left corner to the third point in the array. The bottom-right corner of the rectangle is mapped to the implicit fourth corner of the parallelogram. It is noted that it is preferred to perform the transforms using floating point operations for higher accuracy.

C. Transform Stack

The graphics context preferably maintains a transform stack to save and restore the current transforms in a graphics context. A Graphics.saveTransform( ) method saves a copy of the current world and page transforms onto the transform stack. The method returns a gstackTransform object, which identifies the saved transforms in the stack that can be used later to identify and restore the world and page transforms in a Graphics.restoreTransform method. The current world and page transforms are not modified in the method. The Graphics.restoreTransform(gstackTransform) method restores the current world and page transforms with previously saved transforms from the transform stack. The saved transforms and all transforms above it, if they exist, are removed from the stack by this method.

D. Paths

A "path" describes the geometry of one or more shapes. Applications 36 use paths, such as paths 65 and 66 illustrated in FIG. 5, to draw outlines of shapes, fill the interiors of shapes, and to create clipping regions. A path may be composed of any number of figures, where each figure is either composed of a sequence of connected lines and curves or a geometric shape primitive. The starting point of a figure is the first point in the sequence of connected lines and curves. The ending point is the last point in the sequence. The starting and ending points of a geometric shape primitive are defined by the primitive specification.

In accordance with the present invention, the graphics engine 39 maintains the coordinates of the geometric shapes defined by a path in the world coordinate space as an API region, whereas in the prior art, all region information is maintained as pixel information (i.e., a device region). The coordinates are transformed by the current page transform to the physical coordinate space (i.e., rasterized) only when the path is used. Further, as path operations are not destructive (i.e., the original path data is saved), an application can use a path multiple times. Still further, in accordance with the present invention, the path data can be used to draw geometric shapes via combine and matrix operations on devices to generate regions having different resolutions.

The graphics engine 39 stores the path as a series of lines and cubic Bézier curves. Geometric shapes and text strings are verted to line and curve segments when added to a path. An application can retrieve the coordinates of endpoints and control points in a path using a getPath method. A Path.getPath(types, points) method retrieves the coordinates of endpoints and control points of lines and curves in a path. The points and types parameters specify an array of points and an array of point types, respectively, to receive the path data. The types array specifies the point type of a corresponding point in the points array, and has one of the following values:

PATH_START_POINT—The corresponding point is the starting point of a figure.

PATH_LINE_POINT—The corresponding point is the endpoint of a line segment whose starting point is the previous point.

PATH_BEZIER_POINT—The corresponding point is one of a series of three points (two control points and an endpoint) of a Bézier curve segment whose starting point is the previous point.

The values of PATH_LINE_POINT and PATH_BEZIER_POINT may be combined with PATH_CLOSE (by using the bitwise operator OR) to indicate that the corresponding point is the last point in a figure and the figure should be closed. The method returns the number of points to be retrieved if types and points are NULL. Otherwise, it returns the number of points retrieved.

E. Regions

A region describes the interior or area of paths and geometric shapes (e.g., rectangle, ellipses, pies, and polygons). Regions may be used in clipping, drawing, and hit testing operations. A region object describes a region, supports the persistence interface and may be cloned. The region object may create rectangular region having a rectangular interior, or a path having an interior defined by the path. An application 36 can initialize a region, modify the region's interior, transform the region's coordinates, obtain the bounding rectangle, determine if the region's interior is empty or infinite, and determine if two regions are equal.

A region is described by a combination of paths and rectangles, ellipses, polygons, pies, and the region's coordinates are given in world coordinates and, therefore, are scalable. An application can retrieve a region using a Region.getRegionData method. In accordance with the present invention, the region data (i.e., path, rectangle, operations and transforms) is saved and can later be used to reconstruct the region. The Region.getRegionData (regionData) method retrieves the data describing a region.

Figures 5, 6:
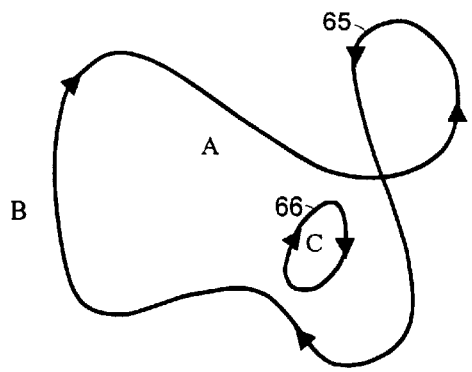
FIG. 5 illustrates exemplary paths.
FIG. 6 is an illustration of the encoding of an arbitrary two-dimensional aliased shape into a region.

An example of a region 100 is illustrated in FIG. 6. Since regions were originally designed to only accommodate shapes displayed as simple opaque images, the image data structure of region is based on an image of an arbitrary two-dimensional shape expressed as a grid of binary values, e.g. 0 and 1, where the value 0 represents a transparent pixel (absence of the shape), and the value 1 represents an opaque pixel (presence of the shape). In the example shown in FIG. 6, an arbitrary two-dimensional shape is subdivided into an 8×8 grid of pixels 102. A region stores the image data according to the rectangular coordinates of the shape on the grid 102. The rectangular coordinates consist of the number of rows, e.g. Y1, Y2, etc. 104, having identical patterns of 1s and 0s in the x-direction, the start and stop locations of those patterns in the x-direction, e.g. X1, X2, etc. 106 and the height of the rows having identical patterns, e.g., H1, H2, etc. 108 (where height is equal to the number of rows).

A region may be used to clamp the output of drawing operations to an area described by its interior on a surface. Such regions are called "clipping regions." Applications use the clipping region to define a drawing area; the window manager uses a clipping region to limit graphics output to the window; and the printer driver uses a clipping region to limit graphics output on the paper one band at a time. The clip region defines the clipping for application drawing operations and is a graphics state. An application 36 can initialize the clip region, modify the clip region's interior, offset the clip region's coordinates, and retrieve a copy of the clip region in the graphics context.

Clipping regions are scalable and their coordinates are preferably given and maintained in world units. Further, both scalable and scan-converted clipping regions can be returned by the graphics engine. A complement region combine operation and region coordinate transform are supported. The clip region stack is supported.

The clipping region in the graphics context may be set using the Graphics.setClipping(path) and Graphics.setClipping(path, mode) methods to set the interiors of closed figures in a path. The figures are transformed by the current transform in the graphics context. The mode parameter, if given, specifies an alternate or winding mode. In the alternate mode, the interiors of closed figures are determined as follows: draw a line from any arbitrary start point in the path to some point obviously outside of the path. If the line crosses an odd number of path segments, the start point is inside the closed region and is therefore part of the fill or clipping area. An even number of crossings means that the point is not in an area to be filled. All open figures and their segments are ignored and not filled.

The winding mode considers not only the number of times that the vector crosses segments of the path, but also considers the direction of each segment. Now draw the same arbitrary line described in the alternate path. Starting from zero, add one for every "up" direction segment that the line crosses, and subtract one for every "down" direction segment crossed. (Up and down directions can be arbitrarily chosen.) If the count result is nonzero, then the start point is inside the fill or clipping area; a zero count means the point is outside the fill or clipping area. The open figures and their segments are ignored and not filled. The open figures in the path may be ignored and not used.

The graphics context maintains a clip region stack. The clip region stack is used to save and restore the current clip region in a graphics context. The current clip region can be saved using a Graphics.saveClip( ) method, which saves a copy of the current clip region onto the clip region stack. It returns a gstackClip object that can be used later to identify and restore the clip region in a Graphics.restoreClip method. The current clip region is not modified. The Graphics.restoreClip(gstackClip) method restores the current clip region with a copy of a previously saved clip region from the clip region stack. The gstackclip object identifies the saved clip region in the stack. The saved clip region and all clip regions above it, if they exist, are removed from the stack.

In addition to the clip region, the system may define its own clipping region called the system-clip region in order to limit graphics output by an application to the drawing surface. For example, the window manager uses the system-clip region to clamp graphics output to the window; the printer driver uses it to limit graphics output on the paper one band at a time. Applications cannot modify the system-clip region. The system-clip region may be highly volatile because in a windowing environment, the system-clip region is the visible area of the window and changes with the area. The visible-clip region is the clipping region that defines the current clipping state of a graphics context. It is the intersection of all current clipping regions, including the clip region and the system-clip region, in the graphics context.

Drawing operations are always clipped to the visible-clip region. An application can obtain the bounding rectangle of the visible-clip region, determine if it is empty or infinite, and retrieve a copy of the region.

When a region is used in clipping, drawing, and hit testing operations, its coordinates are transformed and the interior approximated by a series of rectangles representing its area on a drawing surface in pixel units. This process is known as scan-conversion. An application can retrieve the rectangles approximating a region in a scan-conversion using a Region.getRegionScans method. The Region.getRegionScans(rects, matrix, graphics) method retrieves the rectangles approximating a region on the drawing surface of a graphics context in a scan-conversion. The method retrieves the rectangles in pixel units and also returns the matrix that converts pixel units to world units. The current transform in the graphics context is used in the scan-conversion. The rects parameter specifies an array of rectangles to receive the data. The matrix parameter specifies the matrix to receive the transform from pixel to world units. It returns the number of rectangles to be retrieved if rects is NULL. Otherwise, it returns the number of rectangles retrieved.

III. Exemplary Implementations

Figure 7:
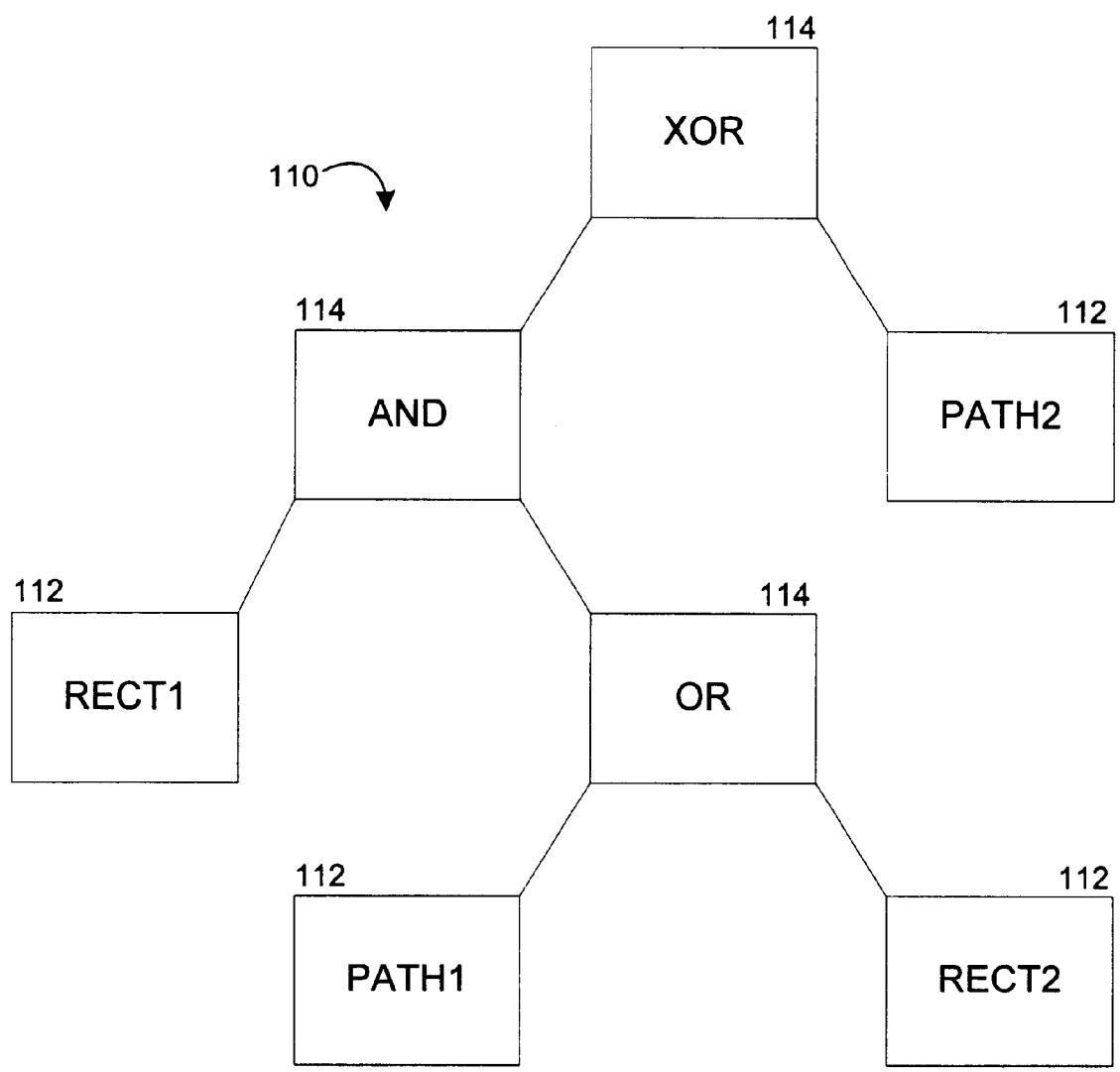
FIG. 7 is an exemplary hierarchical tree illustrating various operations performed on a region.

In accordance with the present invention, it is possible to represent regions by constructing a hierarchical tree representative of a hierarchy of combine (logical) and matrix operations performed on the original path and rectangle, ellipse, pie, and polygon data which make up the region ultimately rendered. An exemplary hierarchical tree 110 is illustrated in FIG. 7, wherein the terminal or leaf nodes 112 of the tree contain the path or rectangle, ellipse, pie, and polygon data and the branch nodes 114 contain the operations and pointers (left and right) performed on the path and rectangle data. The tree in FIG. 7 represents the function:

(RECT1 AND (PATH1 RECT2)) OR XOR PATH2

All region operations are preferably based on scan-conversion. Thus, when the region defined by the hierarchical tree 110 is used, such as to set the clipping area, the scan-converted set of resolution-specific rectangles that represent the region is calculated. This is performed by traversing the region tree 110 from bottom to top, and scan-converting the leaf nodes 112. The combine operations in the branch nodes 114 are then performed on the scan-converted rectangle lists. This process is repeated if another matrix transformation is to be applied to the region or if the region is to be used in a device having a different resolution.

The method of defining regions by a hierarchical tree advantageously provides for an improved anti-aliasing technique within a graphics device. As noted above, when matrix operations are performed in a conventional system on a region within a particular graphics context (i.e., a specific device), the resulting region often includes significant aliasing resulting in the appearance of "jaggies" or "staircasing" at the edges of the primitives of the image region. These undesirable characteristics are common because most shapes can only be approximated with pixels on the raster grid. The present invention overcomes this limitation by scan-converting each region for the specific graphics context only when used, and then performing the combine or matrix operation. Thus, the regions are optimally created for the specific device on which they will be rendered.

Figure 8:
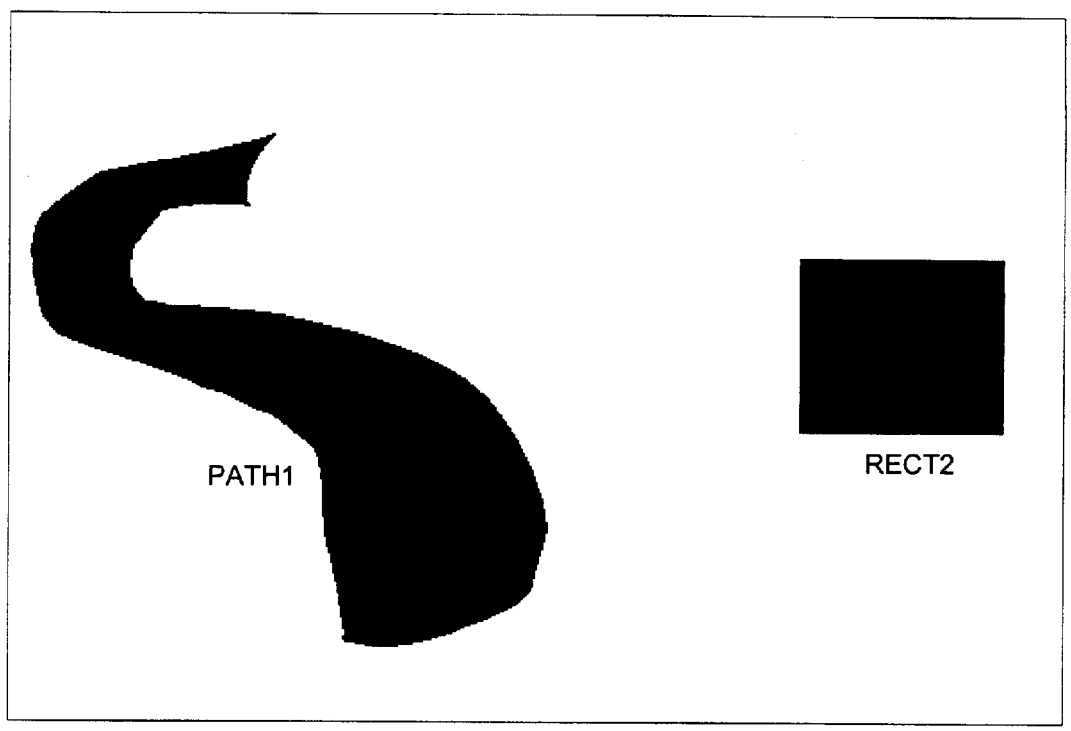
FIGS. 8–14 13 are graphical representations of the beginning, intermediate and final regions defined by the hierarchical tree of FIG. 7.
Figure 9:
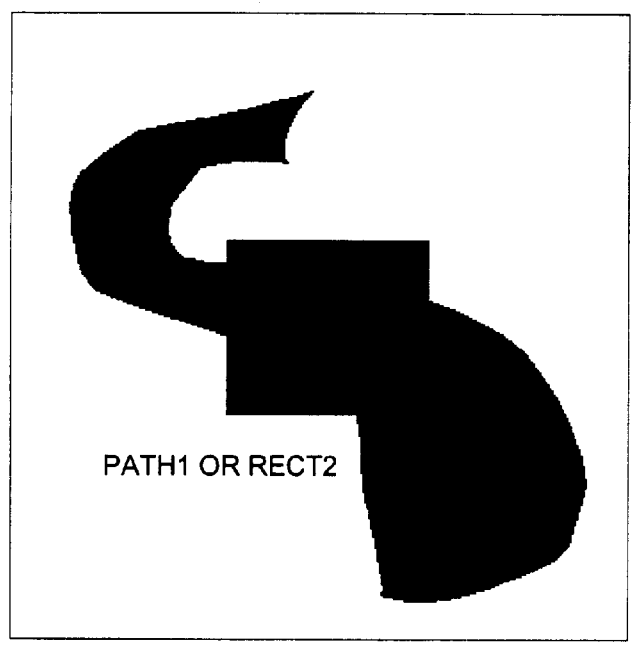
Figure 10:
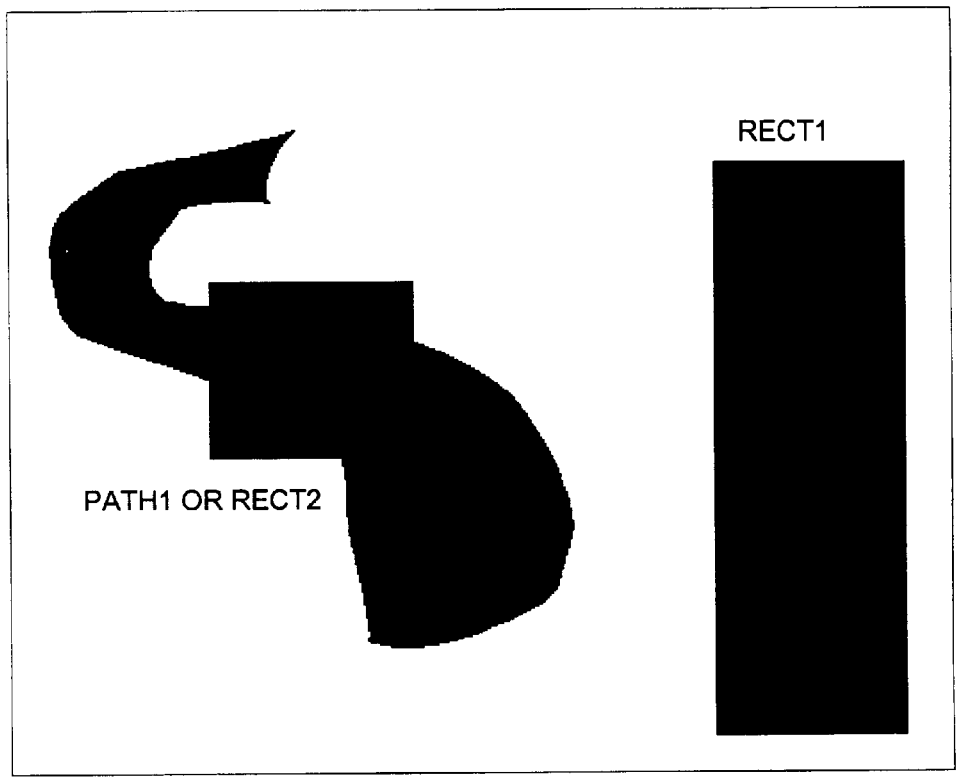
Figure 11:
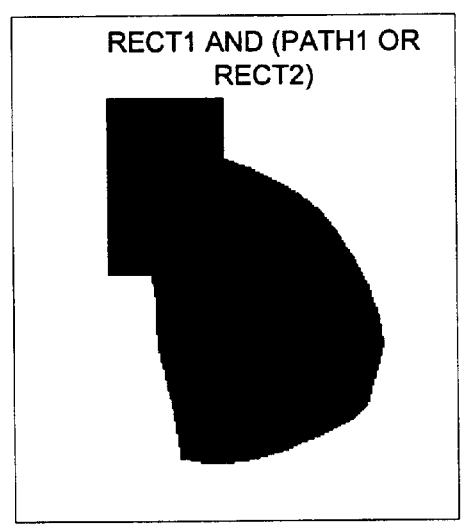
Figure 12:
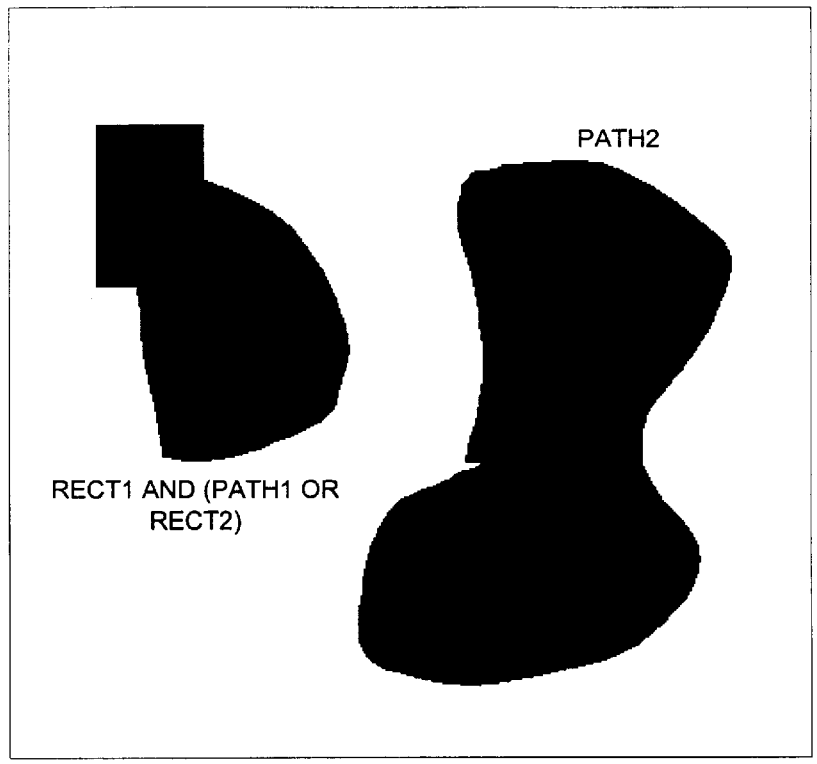
Figure 13:
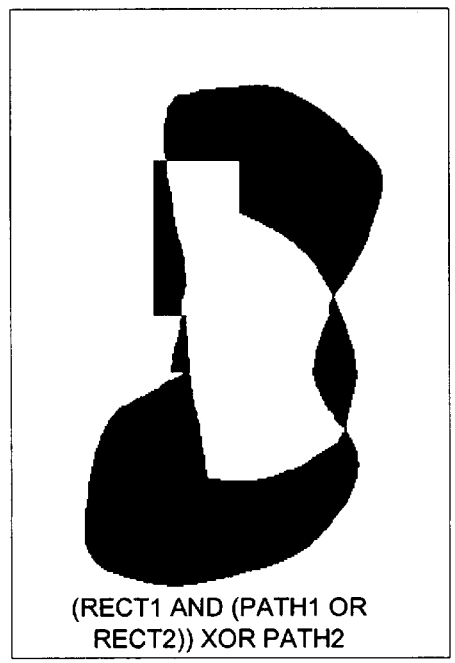

The process of traversing the tree can be illustratively demonstrated by FIGS. 8–13. FIG. 8 illustrates two graphics images, shown as PATH1 and RECT2, which represent two of the leaf nodes 112 in FIG. 7. FIG. 9 illustrates the Boolean operation of PATH1 OR RECT2, i.e., traversing the tree through the first branch node 114 (OR branch). FIG. 10 illustrates the intermediate region of FIG. 9 and a region RECT1, which is shown in another leaf node 112 in FIG. 7. FIG. 11 illustrates the result of the Boolean operation RECT1 AND (PATH1 OR RECT2), which results in traversing through the next branch node 114 (AND branch). FIG. 12 illustrates the resulting intermediate region in FIG. 11 and a region PATH2, which is shown in yet another leaf node 112. Finally, FIG. 13 illustrates the result of (RECT1 AND (PATH1 OR RECT2)) XOR PATH2, which results from traversing through the final branch node 114 (XOR node) in the tree of FIG. 7.

Thus, it can be understood that because the present invention retains the path and geometric data as API data, the tree may be traversed to re-create the final region on different devices, or to apply addition transformations or combine operations. Further, the original path and rectangle data is scan-converted prior to performing the combine and transform operations, which provides for fast rendering of the final region as compared to prior art techniques.

Figure 14:
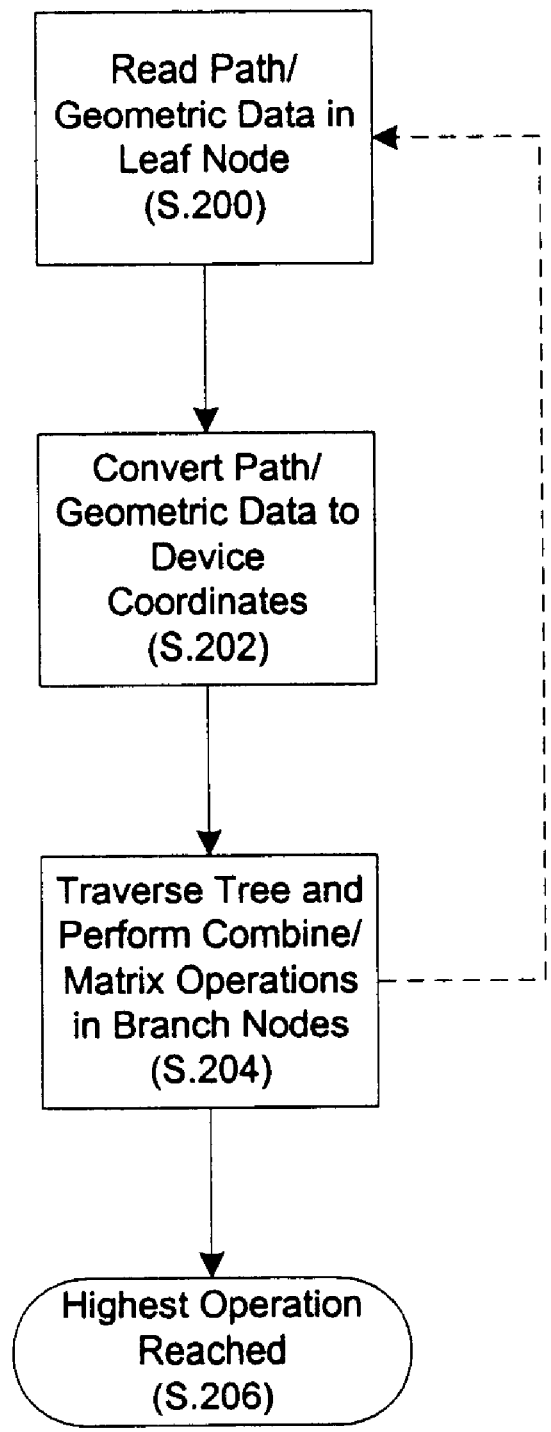

Referring now to FIG. 14, there is illustrated a flow chart that explains the process of traversing a hierarchical tree, in general. The path or geometric data contained in the leaf nodes is read (S.200) and converted to device coordinates (S.202). As the tree is traversed, the logical and matrix operations in the branch nodes are performed to manipulate the path or geometric data (S.204). Also, when leaf nodes that are higher in the structure of the tree are encountered, these higher leaf nodes are converted and operated upon (see, dashed line). Finally, when a highest operation is reached, the process ends (S.206).

Figure 15:
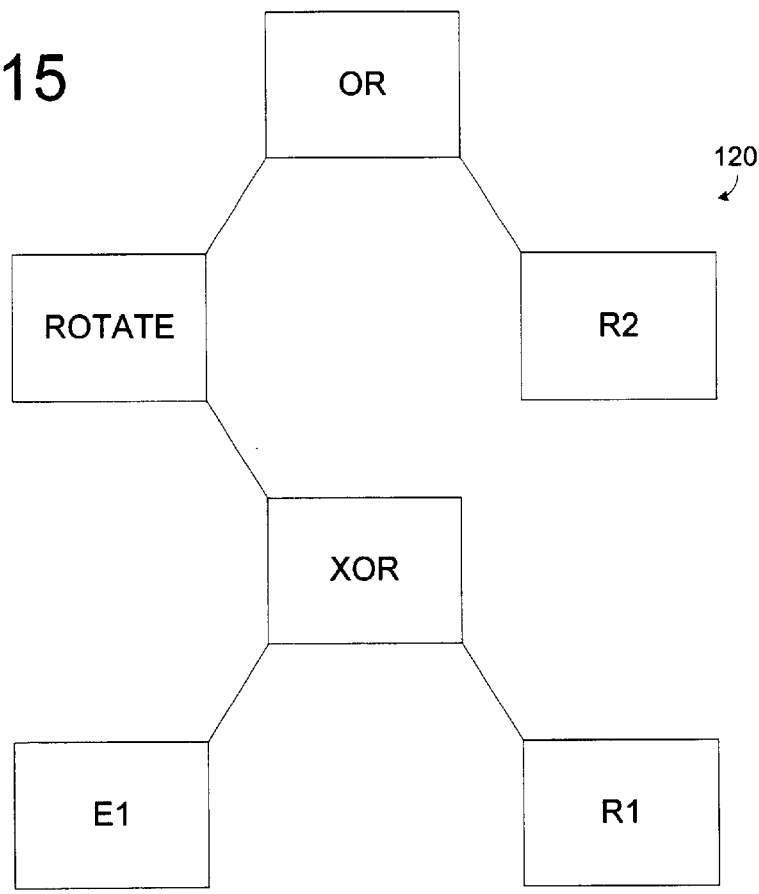
FIG. 15 is a second exemplary hierarchical tree illustrating operations performed on a region in accordance with an embodiment.
Figure 16:
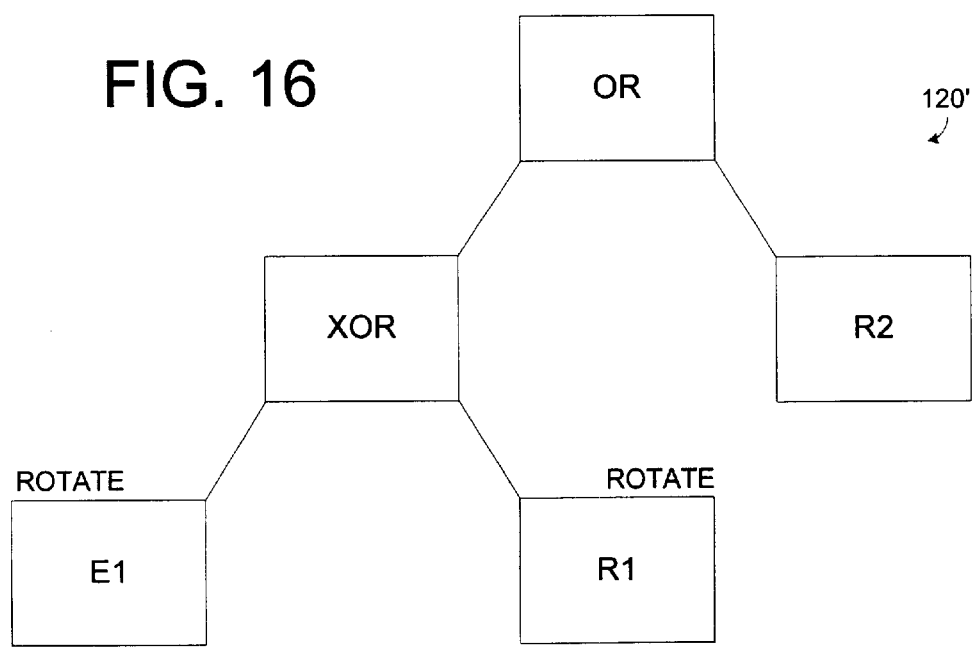
FIG. 16 is another exemplary hierarchical tree illustrating operations performed on a region in accordance with another embodiment.

The exemplary hierarchical trees of FIGS. 14 and 15 are provided to demonstrate alternate techniques by which the present invention may render regions that include matrix transformations. Turning now to FIG. 14, there is illustrated a hierarchical tree 120 that includes a matrix operation (i.e., rotate). FIG. 14 illustrates the function:

$$(E1 XOR R1)^{ROTATE} OR\ R2$$

The function of FIG. 14 is implemented by traversing the tree from bottom to top, as in FIG. 7. The regions E1 (an ellipse) and R1 (a rectangle) are retrieved using the appropriate method (described above) in world state coordinates. The regions are scan-converted and exclusive ORed (XOR) together as defined by the first branch to generate an intermediate region. Then, the intermediate region formed by the operation (E1 XOR R1) is rotated by changing the page transform in accordance with the next branch node (i.e., ROTATE) to, in effect, rotate the intermediate region's world. The transform is saved to the transform stack. The transformed intermediate region is the ORed (OR) with another region R2 in the rotated graphics context to generate the final region.

A second technique is illustrated in the hierarchical tree 120' of FIG. 15. The function defined by FIG. 15 is:

$$((E1)^{ROTATE} XOR (R1)^{ROTATE}) OR\ R2,$$

which is equivalent to the function defined by FIG. 14. This is because affine matrix operations may be distributed over logical operations. Therefore, $(E1\ XOR\ R1)^{ROTATE} = (E1)^{ROTATE} OR\ (R1)^{ROTATE}$. In accordance with the hierarchical tree of FIG. 15, each of the regions E1 and R1 is scan-converted and rotated by a ROTATE transformation matrix. The transform is saved to the transform stack. Next, the rotated regions E1 and R1 are exclusive ORed together (XOR) as defined by the first branch node to generate an intermediate region. The intermediate region is the ORed (OR) with another region R2 in the rotated graphics context to generate the final region.

Thus, according to the present invention matrix transformation operations performed on regions may be implemented using different techniques that provide for fast rendering of transformed graphical objects on different devices.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer-readable medium having stored thereon data for generating a region on a graphics device having a predetermined device coordinate system, said data comprising:

path or geometric data, said path or geometric data describing geometric shapes in a world coordinate system independent of said device coordinate system;

operations to be performed on said path or geometric data, said operations being executed in a hierarchical manner to generate said region; and a world-to-device transform that transforms from said world coordinate system to said device coordinate system, wherein when said operations are performed, said path or geometric data is preserved such that said path or geometric data may be reused on graphics devices having different resolutions, or when additional transformation operations are applied to said region.

2. The computer-readable medium as recited in claim 1, wherein said operations comprise logical and matrix transformation operations.

3. The computer-readable medium as recited in claim 2, wherein said matrix transformation operations are affine matrix operations.

4. The computer-readable medium as recited in claim 1, wherein said operations are arranged having a tree-like logical structure which is traversed from bottom to top, and wherein leaf nodes comprise said path or geometric data, and branch nodes comprise said operations.

5. The computer-readable medium as recited in claim 4, wherein said operations are performed on scan-converted path and geometric data contained in said leaf nodes.

6. The computer-readable medium as recited in claim 1, wherein said region is scalable and wherein coordinates of said region is given and maintained in world units.

7. The computer-readable medium as recited in claim 6, wherein said region comprises a clipping region.

8. A method of generating a region on a graphic device from a hierarchical organization of operations performed on path or geometric data that define said region, comprising:

obtaining said path or geometric data;

converting said path or geometric data to device-specific coordinates;

performing a next operation of said hierarchical organization of operations on said converted path or geometric data; and traversing said hierarchical organization of operations until a highest ranking operation is reached, wherein when said operations are performed, said path or geometric data is preserved such that said path or geometric data may be reused on graphics devices having different resolutions, or when a subsequent matrix transformation is to be applied to said region.

9. The method as recited in claim 8, wherein said operations comprise logical and matrix transformation operations.

10. The method as recited in claim 9, wherein said matrix transformation operations are affine matrix operations.

11. The method as recited in claim 8, wherein said operations are arranged having a tree-like logical structure which is traversed from bottom to top, and wherein leaf nodes comprise said path or geometric data, and branch nodes comprise said operations.

12. The method as recited in claim 8, wherein said region is scalable and wherein coordinates of said region is given and maintained in world units.

13. The method as recited in claim 12, wherein said region comprises a clipping region.

14. In a device having a graphics engine and a computer-readable medium having computer-executable components, said computer-executable components comprising:

path or geometric data, said path or geometric data describing geometric shapes in a world coordinate system independent of a device coordinate system of a graphics device on which said path or geometric data is to be rendered; and a hierarchical organization of operations to be performed on said path or geometric data to combine or transform said path or geometric data, said operations being executed in a hierarchical manner to generate a region, wherein said operations are arranged having a tree-like logical structure which is traversed from bottom to top, and wherein leaf nodes comprise said path or geometric data, and branch nodes comprise said operations, and wherein when said operations are performed, said path or geometric data is preserved such that said path or geometric data may be reused on graphics devices having different resolutions, or when additional transformation operations are applied to said region.

15. The device as recited in claim 14, wherein said operations comprise logical and matrix transformation operations.

16. The device as recited in claim 15, wherein said matrix transformation operations are affine matrix operations.

17. The device as recited in claim 14, wherein said operations are performed on scan-converted path and geometric data contained in said leaf nodes.

18. The device as recited in claim 14, wherein said regions are scalable and wherein coordinates of said regions are given and maintained in world units.

19. The device as recited in claim 18, wherein said region comprises a clipping region.

* * * * *

UNITED STATES PATENT AND TRADEMARK OFFICE
CERTIFICATE OF CORRECTION

PATENT NO. : 6,330,003 B1　　　　　　　　　　　　　　　　　　　Page 1 of 1
DATED : December 11, 2001
INVENTOR(S) : Curtis et al.

It is certified that error appears in the above-identified patent and that said Letters Patent is hereby corrected as shown below:

Column 3,
Line 16, "Figs. 8-14 13" should be -- Figs 8-13 --.

Column 7,
Line 9, "comers" should be -- corners --.
Line 11, "comers" should be -- corners --; same line, after "top-left" delete "comer" and insert -- corner --.
Lines 12, 13, 14, and 15, "comer" should be -- corner --.

Signed and Sealed this

Sixteenth Day of April, 2002

Attest:

JAMES E. ROGAN
Attesting Officer　　　　　Director of the United States Patent and Trademark Office